United States Patent [19]

Stinger

[11] 4,117,189

[45] Sep. 26, 1978

[54] ELECTRICALLY CURABLE, ELASTOMERIC SEALING STRIP

[75] Inventor: Henry Joseph Stinger, Devon, Pa.

[73] Assignee: E. I. Du Pont de Nemours and Company, Wilmington, Del.

[21] Appl. No.: 833,894

[22] Filed: Sep. 16, 1977

[51] Int. Cl.² ................ B32B 15/02; B32B 15/08; B32B 25/02

[52] U.S. Cl. ................ 428/323; 264/27; 264/105; 428/408; 428/461; 428/516; 428/523

[58] Field of Search ............ 264/27, 105; 428/461, 428/465, 516, 523, 408, 323

[56] References Cited

U.S. PATENT DOCUMENTS

| | | | |
|---|---|---|---|
| 2,324,644 | 7/1943 | Powell et al. ........................ | 264/27 |
| 2,426,820 | 9/1947 | Evans et al. ..................... | 428/461 X |
| 2,529,041 | 11/1950 | Muller ................... | 264/27 |
| 2,677,713 | 5/1954 | Weil et al. ................. | 264/27 X |
| 2,683,916 | 7/1954 | Kelly ...................... | 264/27 |
| 2,929,108 | 3/1960 | Sands ..................... | 264/105 |
| 2,956,606 | 10/1960 | Beck et al. .............. | 264/27 |
| 3,249,459 | 5/1966 | Arnold et al. ................. | 428/408 X |

Primary Examiner—Harold Ansher

[57] ABSTRACT

An uncured elastomeric sealing strip suitable for use in highway seals and comprising reinforcing carbon-black filled chlorosulfonated polyethylene in direct contact with two metal electricity conductors parallel to each other and running substantially the whole length of the strip. The elastomer is cured in place by heat generated within the composition when sufficient electric voltage is applied to the metal conductors.

9 Claims, 2 Drawing Figures

ELECTRICALLY CURABLE, ELASTOMERIC SEALING STRIP

BACKGROUND OF THE INVENTION

This invention relates to an elastomeric sealing strip, which can be cured in place to provide a strong bond to a variety of surfaces, including rigid, rough surfaces such as concrete. The strip of the present invention is particularly suitable for highway seals.

Cured-in-place elastomer material offers many advantages over soft materials, such as caulks. Especially desirable properties of such elastomers are their elasticity and resistance to abrasion and weathering.

Most methods of curing an elastomer in contact with other materials, for example, concrete, are inefficient or expensive. For example, heating by radiofrequency is very expensive. Various methods of electric heating, based on the electrical resistance of properly formulated rubber itself or by imbedding electric heating wires in it, have been proposed in the past; see, for example, U.S. Pat. Nos. 3,393,257 and 2,054,000. The former method requires the use of carbon-black fillers having a steep positive temperature coefficient of resistance. The latter method suffers from the disadvantage of causing local hot-spots, which further cause unacceptable degradation of the rubber.

Joule effect heating of rubber holds the best promise because it can be both efficient and inexpensive. Heat is generated when an electric current is passed through an elastomer made conductive by blending with a conductive carbon black. Most Joule effect heating methods require additional steps as well as special precautions. Thus, heat treatment of a freshly compounded elastomer reduces its initial high resistivity to a lower, more practical value. Then, the elastomer must be mechanically constrained until cured, so that carbon particle-to-carbon particle bonds are not broken since this would increase the resistivity to an impractically high level. If a sufficient number of such particle-to-particle bonds are not formed, channeling of the electric current takes place, resulting in hot-spots and blown sections.

It, therefore, is an object of the present invention to provide an elastomeric sealing strip which will cure in a homogeneous manner and provide strong, elastic bonds.

SUMMARY OF THE INVENTION

According to this invention, there is now provided an uncured elastomeric sealing strip which can be cured in place to form strong bonds, without channeling. Said strip is made of chlorosulfonated polyethylene filled with furnace carbon black having an average particle size of about 10-30 nm in diameter, the proportion of the carbon black being at most about 80 parts by weight per 100 parts of the chlorosulfonated polyethylene, said strip being in direct contact along substantially its entire length with two parallel, metallic electricity conductors, said conductors being substantially symmetrically spaced relative to the center of said strip; said strip being curable by heat generated therein when sufficient electric voltage below about 1000 V is applied to said conductors.

DRAWINGS

FIGS. 1 and 2 are isometric views of two representative embodiments of a sealing strip of the present invention.

DETAILED DESCRIPTION OF THE INVENTION

Figure 1:
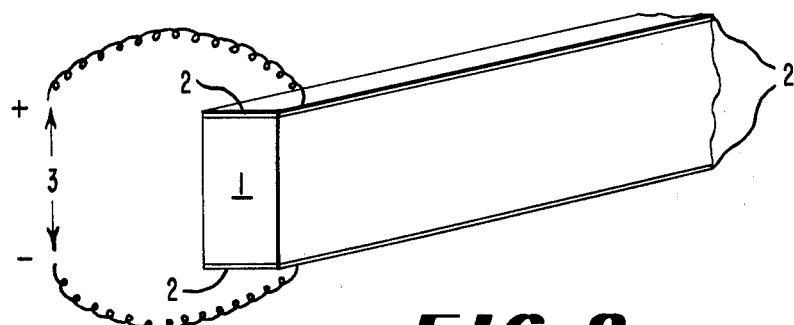

One of the principal uses of the sealing strip of the present invention is in making highway seals. In this application, the sealing strip is placed in an interstice, either natural or man-made, between two concrete pavement sections, then cured in place by application of electricity to the metallic electricity conductors running the length of the strip. To avoid danger of electric shock to those working in the field with such a strip, it is desirable to be able to cure the strip at a low voltage, preferably below 50 V.

While the required voltage will to some extent depend on the cross-section of the strip, it is desirable that the strip have a linear resistivity of about 100 ohms/cm. A 3.66 meter section of such a strip would reach the proper curing temperature range with a potential of 24 V. This voltage is readily available from, for example, truck batteries and can be conveniently provided on a highway construction site. The 3.66 meter section is a practical figure because 3.66 meters is the standard width of high surface laid by paving machines.

A convenient embodiment of the present invention will be extruded ribbon of a desired length, for example, 30.5 meters, having a rectangular cross-section of, say, 1.27 cm × 0.64 cm. The metal conductors normally will be made of copper, although other metals, such as aluminum or even iron, can be used. The conductors usually will be shaped into wires or strips. Copper strips, for instance 0.64 cm wide and 0.04 cm thick can be placed along the 0.64 cm faces of the elastomeric strip; or copper strips about 1.27 cm wide and 0.02 cm thick can be placed along the 1.27 cm faces. The composite structure having metal strips on opposite sides of polymer ribbon, say 30.5 meters long, is wound on a spool using release paper.

In order to lower the initial high resistivity of the composition to a practical value, it is necessary to heat it for a short time, for example, 10 minutes, at about 100°-120° C. This is done conveniently on the spool. The spool then is stored until needed. While a second heat treatment normally is not necessary, it is recommended that it be given just prior to use to reduce the time needed for cure-in-place. Generally speaking, the higher the temperature of heat treatment, the more rapid the decrease in resistivity. However, the final level of resistivity reaches a constant value, regardless of temperature. While a limited amount of pre-cure, which may occur during the heat treatment, is tolerable (or may even be desirable from the standpoint of ease of handling of the polymer), too much heat exposure may make installation of sealing strips of the present invention difficult and may reduce their adhesion to surfaces.

In the field, an appropriate length of the material is cut off and placed in the prepared opening in the concrete. Wires are then connected at one end to the metal strips and at the other end to a suitable power source. The time required to produce adequate cure will vary, but usually will be at least about 10 minutes at cure temperature of about 149°-204° C. The connecting wires then are removed. Although adequate cures can often be obtained with a simple power source, such as an electric battery, without using a temperature controller, any changes in the resistance of the conductive elastomer may result in underheating and thus incomplete cures. Therefore, it is preferable to insert a temperature controller between the power source and the sealing strip.

Chlorosulfonated polyethylene is well known in the art and is readily available commercially from E. I. du Pont de Nemours and Co. under the trademark HYPALON ®. A representative patent which described chlorosulfonated polyethylene and a process for its preparation is U.S. Pat. No. 3,299,014 (Kalil). Any polymer of this general type is satisfactory, provided it cures to a product having sufficient resiliency and weather resistance. Normally, suitable chlorosulfonated polyethylenes will have about 25 to 37 weight percent chlorine and about 1 weight percent sulfur.

Suitable reinforcing carbon black is available from many commercial sources including Cabot Corporation and Phillips Petroleum Co. The specific carbon blacks required by this invention are of the pelletized, fine-furnace black type, rather than blacks having a very high structure network, such as acetylene carbon, or those having high oxygen content and low conductivity, such as channel blacks. The particularly suitable blacks are designated in the trade as ISAF or SAF. Commercial conductive carbon blacks other than furnace blacks often give filled elastomer having higher resistivity, even after heat treatment. They also tend to cause channeling of electric current, resulting in overheating and blowouts. The amount of carbon black in composites of the present invention are chosen so that the physical properties of the product still are useful. Too high a loading level tends to stiffen the polymer excessively.

While dry blends of chlorosulfonated polyethylene and carbon black are very satisfactory, it sometimes is useful to extend the blend with an oil. The addition of oil allows an increase in loading and at the same time improves the predictability and stability of electric resistance. Extending oils normally used in the rubber industry are suitable for this purpose. The amount of oil is about 20 to 60 weight percent, based on dry elastomer.

The compounded elastomer will also contain curing agents. These may be based on metal oxides, for example, a litharge/dipentamethylenethiuram hexasulfide or a magnesium oxide/pentaerythritol system; or on an agent which produces free radicals at elevated temperatures, for example, organic peroxides, such as benzoyl peroxide, dicumyl peroxide, di-t-butyl peroxide, and others well known to the art. The amount of the curing agent will naturally depend on the particular agent used and on the amount of the conductive black as well as of other fillers. For metal oxide cures, the proportion will be about 3 to 50 parts of one or more metal oxides and for peroxides about 2 to 10 parts of organic peroxide by weight per 100 parts of polymer.

One type of sealing strip of the present invention is illustrated in FIG. 1, wherein 1 is the conductive, chlorosulfonated polyethylene strip; 2 is a pair of metal conductors applied to the outer surfaces of the elastomer; and 3 is a pair of wires connecting the metal conductors to an electric power source. In this embodiment, the conductive metal strips 2 are placed on the top and bottom of the elastomer, so that when the sealing strip is placed in a concrete crack, the metal conductors will not come in contact with the concrete.

Figure 2:
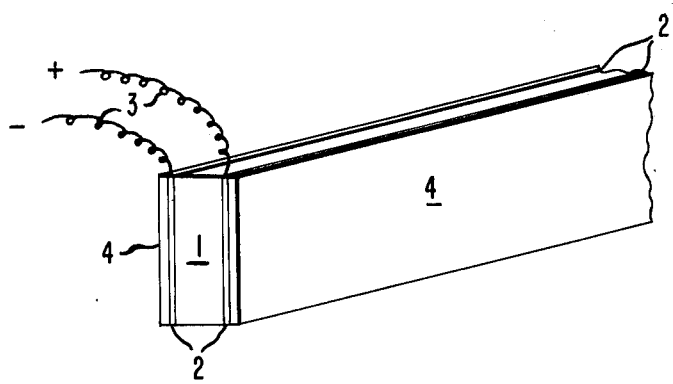

FIG. 2 shows another embodiment of this invention. Here the metal conductors are imbedded in the filled elastomer. They thus are not in direct contact with concrete and can be placed either horizontally or vertically, as desired. The meaning of reference characters is the same as in FIG. 1.

In this embodiment it also is possible to have a conductive center core 1 of the polymer strip, while the outer sections 4 are nonconductive. These outer sections will remain uncured or achieve only a low state of cure. The advantage of an arrangement such as in FIG. 2 lies in lower heat loss to the outside during curing than in the embodiment of FIG. 1 and in the fact that no bare conductors are exposed along the seal. The alternative arrangement of FIG. 2 has the additional advantage that one can give the outer, nonconductive material 4 any desired characteristics, e.g., adhesion or resilience, without regard to its electrical properties. A strip such as shown in FIG. 2 can be made, for example, by laminating to a strip containing metal conductors on the outside, as in FIG. 1, conductive or nonconductive elastomer strips 4; or painting an elastomer latex or solution on the metal conductors of a strip of FIG. 1 and drying the coated strip.

The following example shows the preparation of a sealing strip of the present invention and the calculation of its power requirements, resistivity, and conductor losses.

EXAMPLE

The following compound was blended on a mill and sheeted out into sheets approximately 0.25 cm thick.

| Commercial chlorosulfonated linear polyethylene containing 35 wt % Cl and 1 wt % S | 100 | parts |
| --- | --- | --- |
| ISAF black | 65 | parts/hundred of polymer |
| Mercaptobenzothiazolyl sulfide | 0.5 | parts/hundred of polymer |
| Litharge | 40 | parts/hundred of polymer |
| Hydrogenated wood rosin | 2.5 | parts/hundred of polymer |
| Dipentamethylenethiuram hexasulfide | 0.75 | parts/hundred of polymer |
| Sundex ® 790 oil (Sun Oil Co.) | 30 | parts/hundred of polymer |

Five strips 0.64 cm wide by 7.62 cm long were cut from the sheet and placed together to form a laminate 1.27 cm thick. Strips of copper 0.64 cm wide by 0.04 cm thick were placed against each of the 0.64 cm faces of the laminate. The copper strips were made long enough to extend 1 cm over the ends of the test sample, e.g. 8.62 cm long. This assembly was placed in an air oven at 125° C for 25 minutes. During this time the resistance of the assembly decreased from $4 \times 10^6$ ohms to 177.6 ohms.

The assembly was then removed from the oven, place on a bench, and connected to a 60 Hz power source. Data on time, temperature, and power are shown below:

| Time (min) | Power (watts) | Volts (AC) | Milli-Amperes (AC) | Resistance (AC ohms) | Temperature | |
| --- | --- | --- | --- | --- | --- | --- |
| | | | | | Watts cc | ° C |
| start | 9.39 | 30.2 | 311 | 97.1 | 1.5 | 104.4 |
| ½ | 33.5 | 30.0 | 1117 | 26.86 | 5.45 | 126.7 |
| 1 | 16.86 | 20.1 | 839 | 23.96 | 2.74 | 171.1 |
| 2 | 9.64 | 20.5 | 470 | 43.6 | 1.56 | 188.2 |
| 5 | 5.82 | 20.0 | 291 | 68.7 | 0.95 | 193.3 |
| 10 | 5.74 | 20.8 | 276 | 75.4 | 0.93 | 182.2 |

-continued

| Time (min) | Power (watts) | Volts (AC) | Milli-Amperes (AC) | Resistance (AC ohms) | Watts cc | Temperature °C |
|---|---|---|---|---|---|---|
| 20 | 5.18 | 20.9 | 248 | 84.3 | 0.84 | 171.1 |

Notes:
1) The voltage was adjusted manually to maintain proper temperature. This could have been done automatically using a temperature controller.
2) The volume of the strip was about 6.15 cm³, so that the range of power densities was from 0.84 watts/cc to 5.45 watts/cc.

Samples were taken from the form, and their physical properties were determined according to ASTM D-412-66. Tensile strength was 11,024,000 and 14,124,000 PA, elongation at break was 130 and 150%. This is evidence of adequate cure.

Power Calculations

It was determined in laboratory tests that a power of 4 watts/cm³ was required to raise the sealing strip's temperature from 10° to 177° C (50°-350° F) in 2 minutes, assuming negligible power loss in the metal conductors. It is desired to use a power source of 24V.

A. A Sealing Strip of FIG. 1

The volume of a 3.66 m length of the sealing strip is 295 cm³. The power required is about 1200 watts. The input current at 24V is 1200÷24=50A. The input resistance, R, then is 24÷50≈0.5 ohm. The elastomer resistivity, $\rho$, is calculated from the relationship $$\rho = \frac{R \cdot [\text{area, } A]}{[\text{length, } L]} = \frac{0.5 \text{ ohm} \times 0.635 \text{ cm} \times 366 \text{ cm}}{1.27 \text{ cm}} = 91.5 \text{ ohm} \cdot \text{cm}.$$

Conductor losses for copper ribbon 0.041 cm thick and 0.635 cm wide are calculated from known copper resistivity of $1.724 \times 10^{-6}$ ohm · cm. Resistance per unit length is $$\frac{(1.724 \times 10^{-6} \text{ ohm} \cdot \text{cm}) (30.48 \text{ cm}) \times 100}{(0.635 \text{ cm}) (0.041 \text{ cm})} = 0.0065 \text{ ohm/m}.$$

The combined resistance of both conductors is 0.013 ohm per sealing strip meter.

Power loss per sealing strip meter, $\rho, = I^2 R = (50)^2 (0.013) = 32.5$ w/m.

B. A Sealing Strip of FIG. 2 (second alternative)

Since the directly heated section is smaller than the cross-section of the sealing strip, the resistivity, $\rho$, of the elastomer compound should be proportionately higher than in case A, above. If the thickness of section 1 is, for example, ⅓ of the total thickness of the sealing strip, the compound resistivity in section 1 should be 3 times as high as in case A. Since, however, the width of the copper conductors, 2, is now twice the width of those in case A, their thickness can be decreased to 0.2 mm for the same power losses.

We claim:

1. An uncured elastomeric sealing strip, which can be cured in place, said sealing strip being made of a composition consisting essentially of chlorosulfonated polyethylene filled with furnace carbon black having an average particle size of about 10-30 nm in diameter and containing an effective amount of a curing agent, the proportion of the carbon black being at most about 80 parts by weight per 100 parts of chlorosulfonated polyethylene; said strip being in direct contact along substantially its entire length with two parallel, metallic electricity conductors, said conductors being substantially symmetrically spaced relative to the center of said strip; said strip being curable by heat generated therein when sufficient electric voltage below about 1000 V is applied to said conductors.

2. The sealing strip of claim 1 wherein the chlorine content of chlorosulfonated polyethylene is about 25-37 weight percent, and the sulfur content is about 1 percent.

3. The sealing strip of claim 1 having a rectangular cross-section, the electricity conductors being located along two opposite sides of the sealing strip's body.

4. The sealing strip of claim 3 wherein the electricity conductors are located within the body of the strip.

5. The sealing strip of claim 4 wherein the body of the sealing strip is made of at least two different elastomer compositions, the reinforced carbon black-filled chlorosulfonated polyethylene composition constituting the center portion of the sealing strip in direct contact with both electricity conductors, the other elastomer composition or compositions being in direct contact with the outer surface of each electricity conductor.

6. The sealing strip of claim 1 wherein the reinforcing carbon black-filled chlorosulfonated polyethylene composition is extended with about 20-60 parts of oil per 100 parts by weight of dry elastomer.

7. The sealing strip of claim 1 wherein the curing agent contains a metal oxide present in an amount of about 3-50 parts per 100 parts by weight of polymer.

8. The sealing strip of claim 1 wherein the curing agent is an organic free-radical generator.

9. The sealing strip of claim 1 wherein the free-radical generator is a peroxide and is present in an amount of about 2-10 parts per 100 parts by weight of polymer.

* * * * *